Nov. 15, 1960     C. E. FRANK ET AL     2,960,533
SEPARATION PROCESS FOR SEBACIC ACID
Filed April 12, 1957
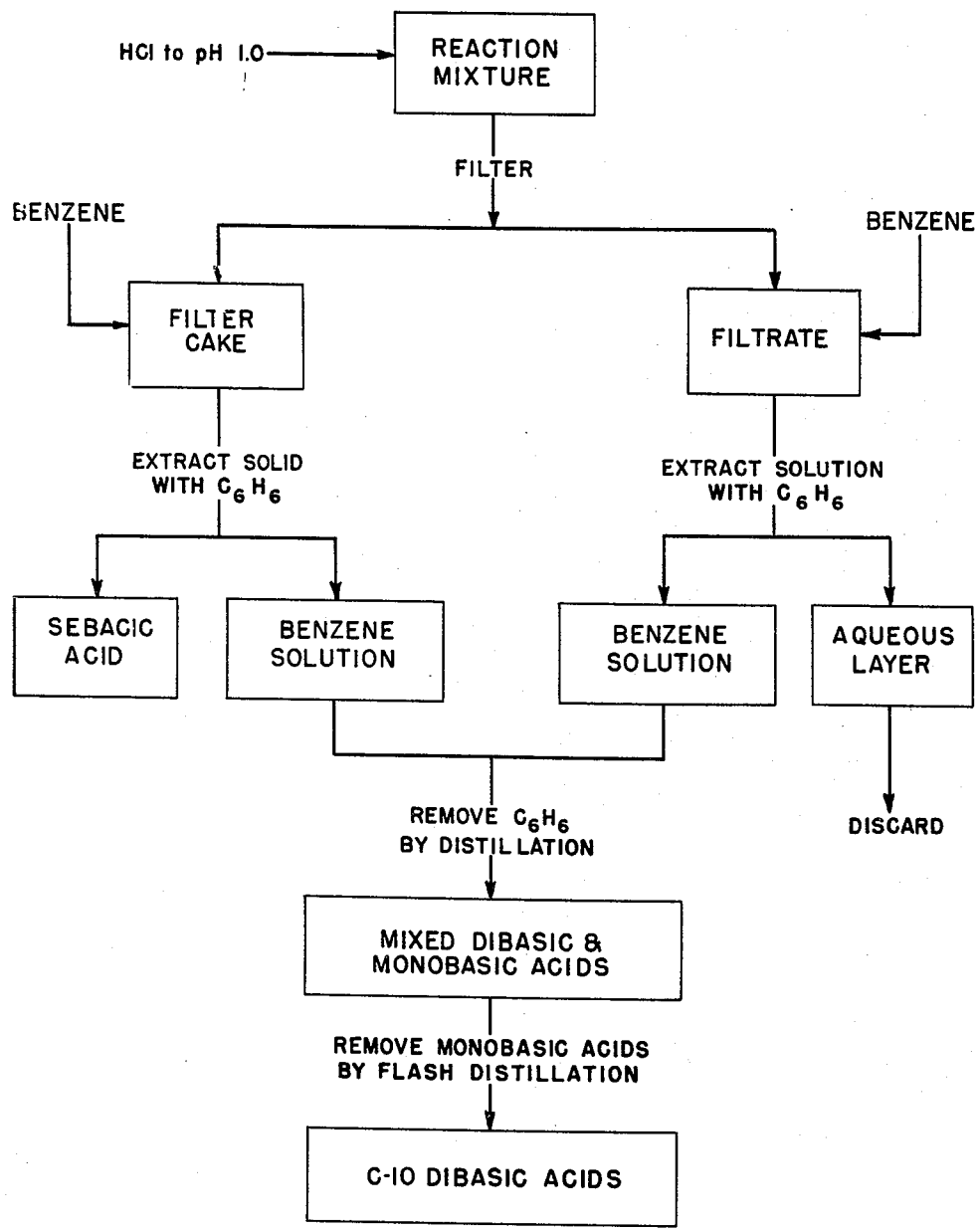
CHARLES E. FRANK
WALTER E. FOSTER
*INVENTOR.*
BY *Mitchell G. Condos*
ATTORNEY

United States Patent Office 2,960,533
Patented Nov. 15, 1960

2,960,533

SEPARATION PROCESS FOR SEBACIC ACID

Charles E. Frank, Cincinnati, Ohio, and Walter E. Foster, Baton Rouge, La., assignors to National Distillers and Chemical Corporation, New York, N.Y., a corporation of Virginia Filed Apr. 12, 1957, Ser. No. 652,416

10 Claims. (Cl. 260—537)

This invention relates generally to a method for isolating and separating acids into relatively pure fractions and more particularly to a novel and highly effective method for recovering substantially pure sebacic acid from other acidic reaction products.

In accordance with recently discovered processes, an aliphatic conjugated diolefin can be treated with a finely divided alkali metal, such as sodium or potassium, in a selected ether medium and preferably in the presence of a relatively small amount of a polycyclic aromatic hydrocarbon at a temperature preferably below about 0° C. to provide a mixture of dimetallo derivatives of the dimerized diolefin. These dimetallo derivatives can then be carbonated at a temperature preferably below about 0° C. to produce the corresponding salts of dicarboxylic acids in high yields and selectivities.

In the case of an initial reaction using sodium and butadiene, the product obtained comprises the disodium derivatives of the aliphatic isomeric octadienes. Studies of the structures of the saturated diacids arising therefrom after carbonation and hydrogenation indicate that mixtures of isomeric $C_{10}$ dicarboxylic acids are obtained. Thus following final hydrogenation and acidification, the product mixtures yield sebacic acid, 2-ethylsuberic acid, and 2,5-diethyladipic acid, together with small amounts of other acids including monobasic carboxylic acids.

In the preferred type of operation, the butadiene and finely dispersed sodium are reacted in an active ether solvent preferably in the presence of a polycyclic aromatic hydrocarbon. The disodiooctadienes formed are subsequently carbonated to the sodium salts of the unsaturated $C_{10}$ acids. Organic solvents are then removed and the solids are converted to an aqueous solution which is preferably filtered prior to hydrogenation. A catalytic hydrogenation is then carried out to convert the sodium salts of all acidic compounds to completely saturated salts.

The resulting final aqueous reaction mixture contains varying amounts of isomeric $C_{10}$ dicarboxylic acids including the linear isomer sebacic acid, as sodium salts. It also contains the salts of the valuable branched chain $C_{10}$ acids as well as certain monobasic acids of varying molecular weights including $C_5$, $C_9$, and higher. There are also present relatively smaller amounts of impurities such as hydrogenating catalyst, condensed polymeric acids, and the like.

The process of this invention comprises, in general, the treatment of a mixture of the alkali metal salts of the organic acids or the mixture of the corresponding liberated organic acids, obtained by carbonation of a mixture of dialkali metal octadienes, to separate the straight chain $C_{10}$ diacid (sebacic) from its isomers present in the mixture, such a separation being effected by use of a solvent selective for the isomeric components of the mixture. For such usage, the selective separation of the organic acid components of the mixture is effected by an inert liquid aromatic hydrocarbon as defined more fully hereinafter.

In the use of starting mixtures comprising an aqueous mixture of alkali metal salts of saturated $C_{10}$ aliphatic acids, such as that prepared by carbonation of a mixture of dialkali metal octadienes followed by hydrogenation, the aqueous mixture can be acidified with a suitable acid (e.g., hydrochloric, sulfuric acid) whereupon the organic acids are precipitated. The resulting mixture can then be filtered, if desired, and the filter cake treated with a suitable liquid aromatic hydrocarbon to selectively dissolve the $C_{10}$ isomers of sebacic acid from sebacic acid itself. The process can also be carried out without separation of the precipitated acids from the aqueous, acidified mixture in which case, the acidified aqueous mixture containing the organic acids is similarly treated with an inert liquid aromatic hydrocarbon whereby the isomeric $C_{10}$ acids dissolve in the liquid hydrocarbon and the sebacic acid remains in suspension and is separated by filtration from the dissolved acids to provide substantially pure sebacic acid. Since the process in its basic concept resides in the separation of sebacic acid from its isomers by means of a selective solvent as aforesaid, the invention embodies liberation of the organic acids, from a mixture of their alkali metal salts, in presence of the suitable liquid aromatic hydrocarbons whereupon the liberated isomeric organic acids selectively dissolve in the aromatic hydrocarbon phase and the non-dissolved sebacic acid remains suspended in the aqueous and organic phases from which it can be separated to provide substantially pure sebacic acid.

To further enhance the recovery of the desired $C_{10}$ diacids in substantially pure form, the present invention further embodies a treatment, at a stage in the process wherein the organic acids are in liberated form (i.e., not in the form of alkali metal salts) involving use of an inert liquid aliphatic hydrocarbon for selective removal of substances, such as monobasic organic acids from the desired $C_{10}$ diacids. Preferably, such a treatment is carried out following liberation of the organic acids from their salts in an acidified aqueous mixture prepared as aforedescribed by carbonation of a mixture of dialkali metal octadienes followed by hydrogenation but, if desired, the treatment for monobasic acid removal can be carried out at other stages of the process, such as following separation of sebacic acid from its isomers in which case either the separated sebacic acid, or its isomers, or both, can be treated for selective removal of monobasic acids, neutral substances, etc. that are present.

Since the process embodies the separation of the defined acids from initial aqueous mixtures of their salts, it is desirable to carry out an initial "test" titration to determine the free alkali and total organic acid content as such as determination establishes the amount of acid that is necessary for liberating the organic acids.

In order to illustrate an embodiment of the invention wherein the organic acids are liberated from the aklali metal salts in an aqueous medium, reference is made to the accompanying general flow plan wherein the total aqueous reaction mixture is acidified to a pH of 1.0–2.0 with a strong mineral acid, suitable examples of which include hydrochloric acid and sulfuric acid, filtered, and the filter cake washed with benzene, toluene or other suitable inert aromatic hydrocarbon. For such a purpose, the aromatic hydrocarbon that is employed is a selective solvent for isomers of sebacic acid whereupon, upon treatment of the filter cake with such a substance, the isomers of sebacic acid are selectively dissolved out of the filter cake. Though substances such as benzene, toluene, etc. are particularly suitable for such a purpose, other inert liquid aromatic hydrocarbons can be used, examples of which include xylene, cumene, cymene, ethylbenzene, and the like.

On the other hand, the purification and recovery of sebacic acid from such aqueous mixtures of alkali metal salts of sebacic acid and its isomers can be effected by other methods. For example, in one method and again following the general outline of the flow plan, the aqueous mixture of acids can be acidified, as by mineral acids such as hydrochloric acid and sulfuric acid, to a relatively low pH (e.g., about 1.0 to about 2.5) whereby the organic acids in the mixture are liberated from their salts and precipitate out of solution, following which the resulting aqueous mixture (without separation of the solids from the aqueous medium) is treated by addition of a suitable inert liquid aromatic hydrocarbon (e.g., benzene) whereupon substantially all of the sebacic acid remains in solid form and its isomers dissolve in the aromatic hydrocarbon. The sebacic acid can then be filtered out to provide a solution (filtrate) of its isomers. In further accordance with the process embodied herein substantially pure sebacic acid can then be recovered from the filter cake and its isomers from the filtrate.

In still other embodiments, the purification and recovery of sebacic acid from the defined aqueous mixtures of alkali metal salts can be carried out by adding the liquid inert aromatic hydrocarbon to the aqueous mixture of such salts whereby a two phase system results (i.e., an aqueous phase and an aromatic hydrocarbon phase), following which a mineral acid is added to liberate the organic acids from their salts (in the aqueous phase) whereby, due to liberation of the acids in the presence of the aromatic hydrocarbon, the sebacic acid precipitates out and the isomers thereof dissolve in the hydrocarbon phase. Separation (as by filtration) of the precipitate provides a filter cake and a filtrate which can then be processed as embodied herein for recovery of substantially pure sebacic acid from the filter cake and its isomers from the filtrate.

Because of this selective solvent action, the resultant sebacic acid can be recovered in substantially high purity having a melting point in the range of 126 to 133° C., and in substantial recoveries of about 90–95% of the total sebacic acid present in the starting mixture. Filtrates obtained from the separation of sebacic acid can be extracted with additional liquid aromatic hydrocarbons to recover dibasic acids other than sebacic acid, including 2-ethylsuberic, and 2,5-diethyladipic acids which remain in such filtrate solution. The extracts (i.e., aromatic hydrocarbon extract) from the solid and aqueous extractions then are preferably combined and the liquid aromatic hydrocarbon removed by distillation to yield a mixed dibasic acid fraction from which essentially all of the sebasic acid has been removed. Such mixed acid fraction may be further purified, if necessary, by flash distillation to remove any monobasic acid components that may still be present and by a carbon black treatment of the crude 2-ethylsuberic and 2,5-diethyladipic mixture. These can be purified still further by other techniques, if desired.

The invention will be described in further detail by the following examples although it is not intended to limit it specifically thereto. The parts are by weight unless otherwise stated.

*Example 1*

This experiment was carried out using an aqueous solution of the sodium salts of the total acids, including both dibasic and monobasic acids of the organic series, obtained by the above described series of reactions starting with butadiene and including a catalytic hydrogenation to saturate the carbonated mixture of disodiooctadienes.

There were used 550 parts of the mixture containing about 101 parts of acids as detected by preliminary experiments. This solution was stirred while maintaining a temperature of 70–80° C. during the addition of sufficient 12 N HCl to liberate substantially all of the organic acids from their sodium salts. This necessitates that the mixture be acidified to a pH of about 1.0. The acidified mixture was then cooled to allow crystal growth of the precipitate and thereby facilitate subsequent filtration. The cooled mixture was filtered and pressed to remove the bulk of the aqueous layer. The precipitate was then dried before proceeding to a benzene extraction.

The dried filter cake was washed with three portions of 220 parts each of hot benzene to remove the remaining benzene soluble acids. This was done most efficiently by preparing a slurry of the solid filter cake containing the acids with the benzene in each case and allowing the mixture to digest a few minutes before withdrawing the benzene phase. Evaporation of residual benzene from the final filter cake yielded 30 parts of sebacic acid, M.P., 131.5–132.5° C.

The aqueous filtrate from the original acid precipitation was extracted with three portions of 110 parts each of benzene to remove portions of the more water soluble acids remaining in this phase. These benzene extracts were then added to the benzene solution from the sebacic acid wash. The combined benzene solution was treated with a small amount of carbon black to remove traces of colored impurities. Removal of the benzene by distillation yielded 70 parts of 2-ethylsuberic and 2,5-diethyladipic acids containing only small amounts of monobasic acids and of sebacic acid.

*Example 2*

For this example, an aqueous solution of sodium salts of the total acids (as in Example 1) is employed.

To 550 parts of the aqueous mixture containing about 101 parts (by weight) of acids, sufficient 12 N HCl is added while agitating and maintaining a temperature of 70–80° C. until a pH of 1.0–2.0 is reached whereby the organic acids are liberated from their salts and precipitate out. To the resulting mixture, cooled to 50° C., and without separation of the precipitate from the acidified aqueous medium, 220 parts of hot benzene is added. Upon cooling the resulting mixture to about 25° C., and filtering, there is provided a filter cake and a filtrate which, upon processing as described in Example 1, results in substantially similar recovery of sebacic acid from the filter cake and isomers thereof from the filtrate as in Example 1.

*Example 3*

For this example, an aqueous solution of sodium salts as used in Example 1 is employed.

To 550 parts of the aqueous mixture containing about 101 parts of acids, 220 parts of toluene is added whereby a two phase system results, i.e., an aqueous phase and a toluene phase with the salts being in solution in the aqueous phase. To such a system there is added, while the system is agitated and maintained at about 30° C. sufficient 12 N HCl to liberate the organic acids (from their salts in the aqueous phase) whereby the liberated sebacic acid precipitates out and the isomers thereof dissolve in the toluene phase. Filtration provides a filter cake and a filtrate from which, upon processing as described in Example 1, substantially pure sebacic acid is recovered from the filter cake and its isomers from the filtrate in a manner substantially similar to the recovery obtained in Example 1.

To further enhance purification and recovery of the desired $C_{10}$ diacids from a mixture thereof as embodied for treatment herein, the mixture of acids or components thereof at any stage of the process can be treated with a suitable liquid aliphatic hydrocarbon to selectively remove substances such as monobasic acids, ketones, etc. For such a purpose, hydrocarbons such as petroleum ether, hexane, heptane, octane, isooctane, alkylate, and the like may be used. For example, in the use of a mixture of sebacic acid and its isomers as aforedefined, the mixture can be treated with petroleum ether whereby there is extracted an oily substance comprised substantially of monobasic acids. Following such an extraction of monobasic acids, the remaining mixture of diacids can be treated for separation of sebacic acid from its isomers by the process embodied herein. On the other hand, if desired, the treatment with the aliphatic hydrocarbon can be carried out by washing the filtered, precipitated sebacic acid, or by washing the aromatic hydrocarbon phase containing the isomers of sebacic acid, or both, as well as at any other stage of the herein described purification and separation process.

To illustrate such an embodiment, the following example is set forth.

*Example 4*

30.6 grams of saturated $C_{10}$ diacids, prepared by the aforedescribed process in which initial reaction between butadiene and sodium was followed by carbonation, hydrogenation and acidification, was washed with petroleum ether whereby 7.5 grams of a monobasic acid fraction having a neutral equivalent of 130 was extracted by the petroleum ether, leaving 21.9 grams of a mixture insoluble in the petroleum ether.

The insoluble substance was then washed at room temperature, with 6–15 ml. portions of benzene whereupon an extract was obtained containing 12.1 grams of a substance having a neutralization equivalent of 110 and comprised substantially of isomers of sebacic acid, leaving 9.7 grams of a substance that was not extracted by the benzene. The benzene insoluble substance was then extracted four times with 25 ml. of hot water from which 2.1 grams of the 9.7 grams were extracted by the hot water, leaving a water insoluble substance that was recrystallized from toluene and from which sebacic acid (M.P. 133–133.8, neutralization equivalent, 103) was obtained in a 17% yield based on the starting mixture of the $C_{10}$ saturated diacid mixture.

This application is a continuation-in-part of co-pending application Serial No. 410,497, filed February 16, 1954 (now U.S. Patent No. 2,790,002).

While there are above disclosed but a limited number of embodiments of the invention herein presented, it is possible to produce still other embodiments without departing from the inventive concept herein disclosed, and it is desired therefore that only such limitations be imposed on the appended claims as are stated therein.

What is claimed is:

1. A process for separation of sebacic acid from an aqueous mixture containing alkali metal salts of monobasic organic acids and dibasic organic acids including substantial amounts of alkali metal salts of sebacic acid and isomers of sebacic acid, said mixture having been obtained by hydrogenation of a reaction mixture prepared by carbonation of dialkali metal octadienes, which comprises acidifying said aqueous mixture with a mineral acid to liberate the organic acids from their salts whereby the organic acids are precipitated, contacting the resulting acidified mixture containing the organic acids with an inert liquid aromatic hydrocarbon that selectively dissolves the isomers of sebacic acid from the mixture thereof with sebacic acid, and in at least one stage of said process contacting a fraction containing a liberated organic $C_{10}$ diacid with an inert liquid aliphatic hydrocarbon to selectively extract organic monobasic acids from their mixture with the organic diacid.

2. A process, as defined in claim 1, wherein the precipitated organic acids are separated from the acidified aqueous mixture, the organic acids are contacted with the inert liquid aromatic hydrocarbon thereby producing an aromatic hydrocarbon phase containing in solution the isomers of sebacic acid and separating the undissolved sebacic acid from the solution of its isomers.

3. A process, as defined in claim 1, wherein the acidified aqueous mixture containing the liberated organic acids is contacted with an inert liquid aliphatic hydrocarbon to selectively extract monobasic organic acids from said acidified mixture.

4. A process, as defined in claim 1, wherein, following the selective extraction of sebacic acid isomers from their mixture with sebacic acid, the undissolved sebacic acid is separated from the solution of its isomers, and the sebacic acid is contacted with an inert liquid aliphatic hydrocarbon to selectively extract monobasic organic acids in mixture with the sebacic acid.

5. A process, as defined in claim 1, wherein the liquid aromatic hydrocarbon is selected from the group consisting of benzene and toluene.

6. A process for separation of sebacic acid from an aqueous mixture containing alkali metal salts of monobasic organic acids and dibasic organic acids including substantial amounts of alkali metal salts of sebacic acid and alkali metal salts of isomers of sebacic acid, said mixture having been prepared by hydrogenation of a reaction mixture obtained from carbonation of dialkali metal octadienes, which comprises adding to said aqueous mixture of organic acid salts an inert liquid aromatic hydrocarbon that is a selective solvent for the isomers of sebacic acid thereby providing a composition comprising an aqueous phase containing the salts of the organic acids and an aromatic hydrocarbon phase, adding to said composition a mineral acid in amount sufficient to liberate said organic acids from their salts whereby the liberated isomers of sebacic acid dissolve in said aromatic hydrocarbon phase and the sebacic acid is precipitated, and recovering the sebacic acid substantially devoid of said isomer acids, and in at least one stage of the process contacting a fraction containing a free $C_{10}$ diacid with an inert liquid aliphatic hydrocarbon to selectively extract organic monobasic acids from mixtures with the $C_{10}$ diacids.

7. A process, as defined in claim 6 wherein the liquid aromatic hydrocarbon is selected from the group consisting of benzene and toluene.

8. A process, as defined in claim 6, wherein the aliphatic hydrocarbon is petroleum ether.

9. A process, as defined in claim 1, wherein the organic monobasic acid contains at least 5 carbon atoms.

10. A process, as defined in claim 6, wherein the organic monobasic acid contains at least 5 carbon atoms.

References Cited in the file of this patent

UNITED STATES PATENTS

| | | |
|---|---|---|
| 2,365,290 | Price et al. | Dec. 19, 1944 |
| 2,790,002 | Frank et al. | April 23, 1957 |
| 2,858,337 | Mednick et al. | Oct. 28, 1958 |

OTHER REFERENCES

Seidell, "Solubilities of Organic Compounds," 3rd ed., 1941, pages 302, 306, 440, 619.

Weissberger: Technique of Organic Chemistry, vol. III, part I, page 307 (1956).